Nov. 23, 1965    J. G. WAHLGREN    3,218,848
SIPE BEND TESTING MACHINE
Filed Oct. 30, 1962    5 Sheets-Sheet 1
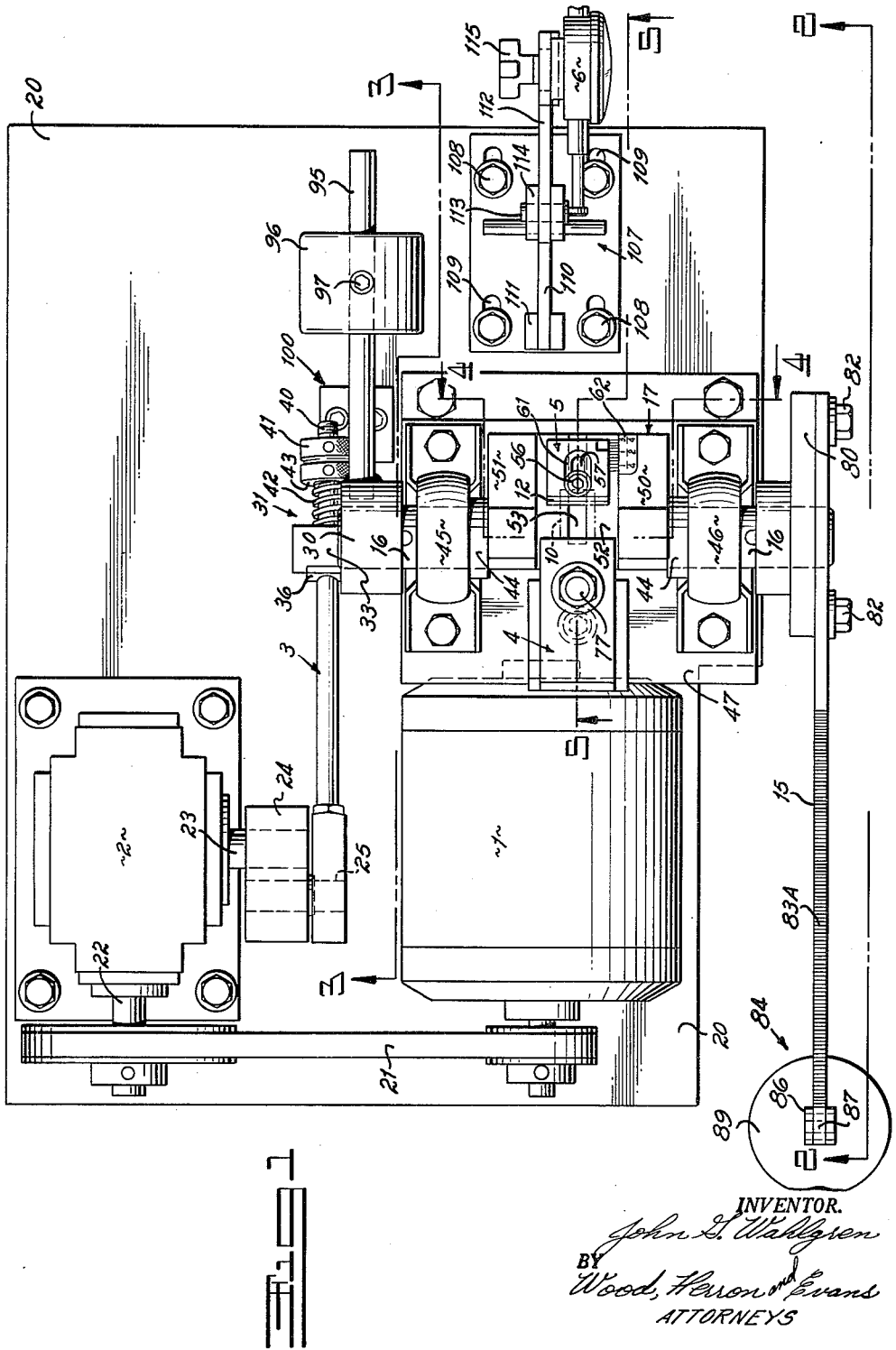
INVENTOR.
John G. Wahlgren
BY
Wood, Herron and Evans
ATTORNEYS

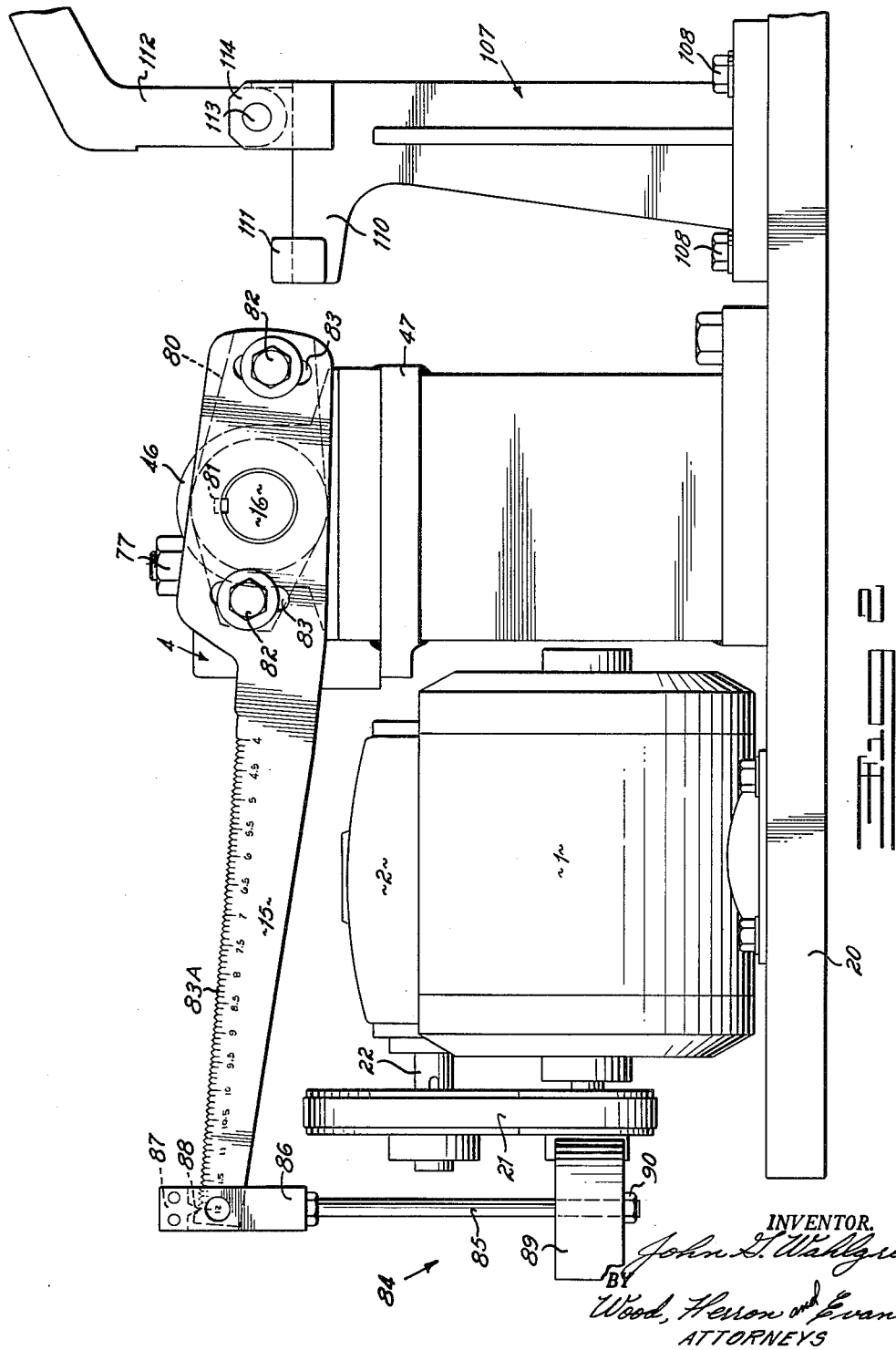

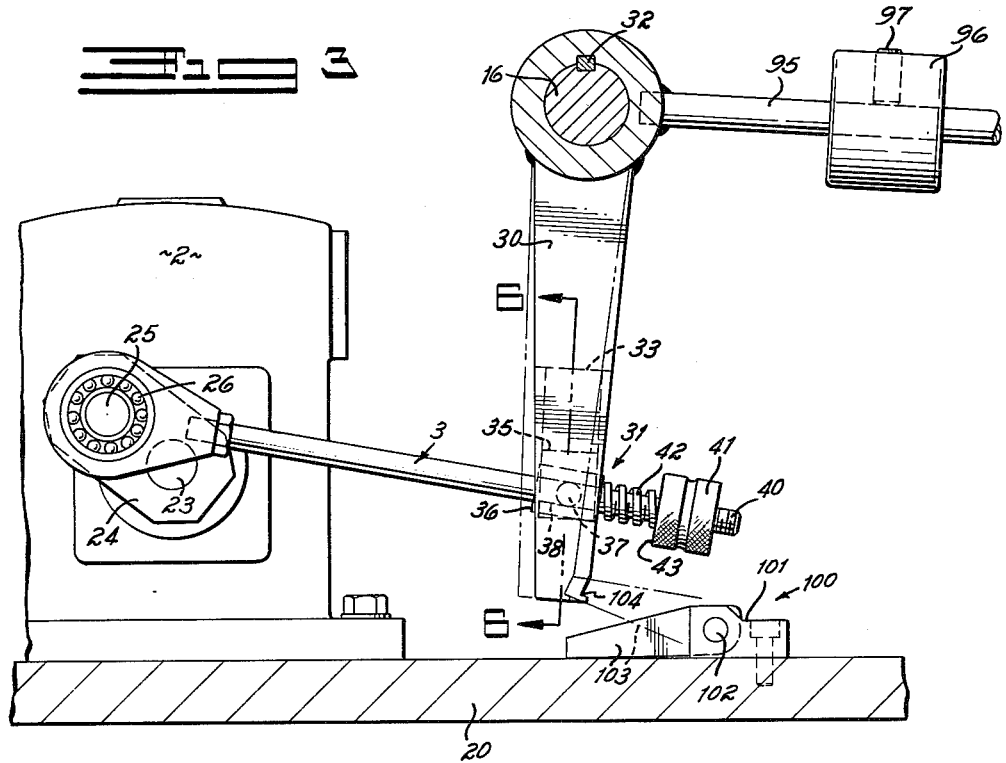
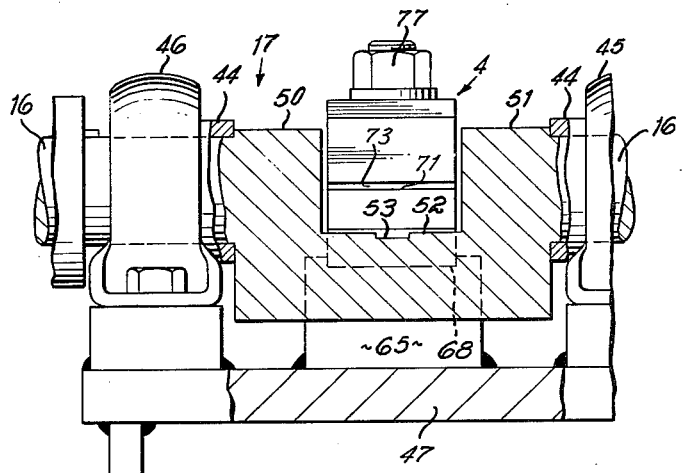

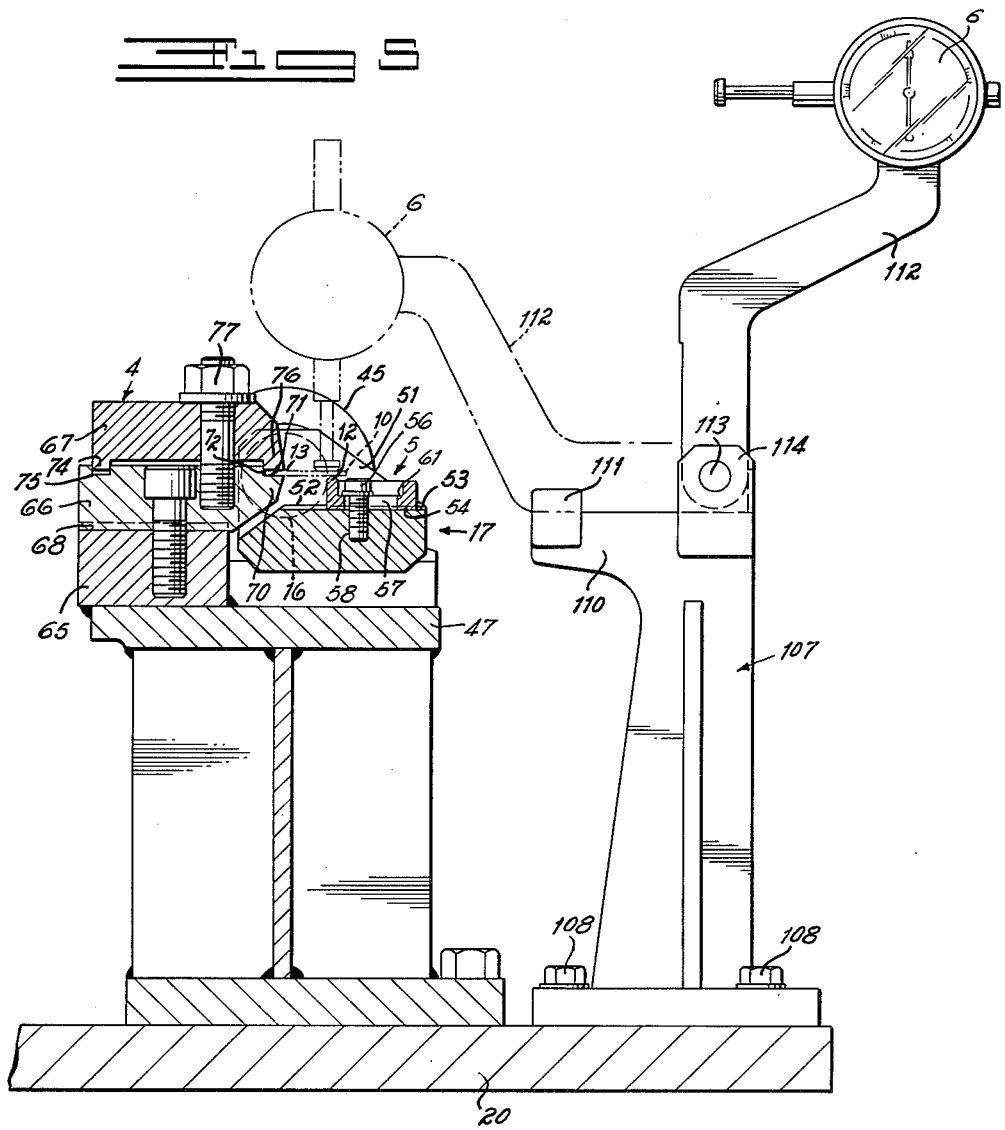

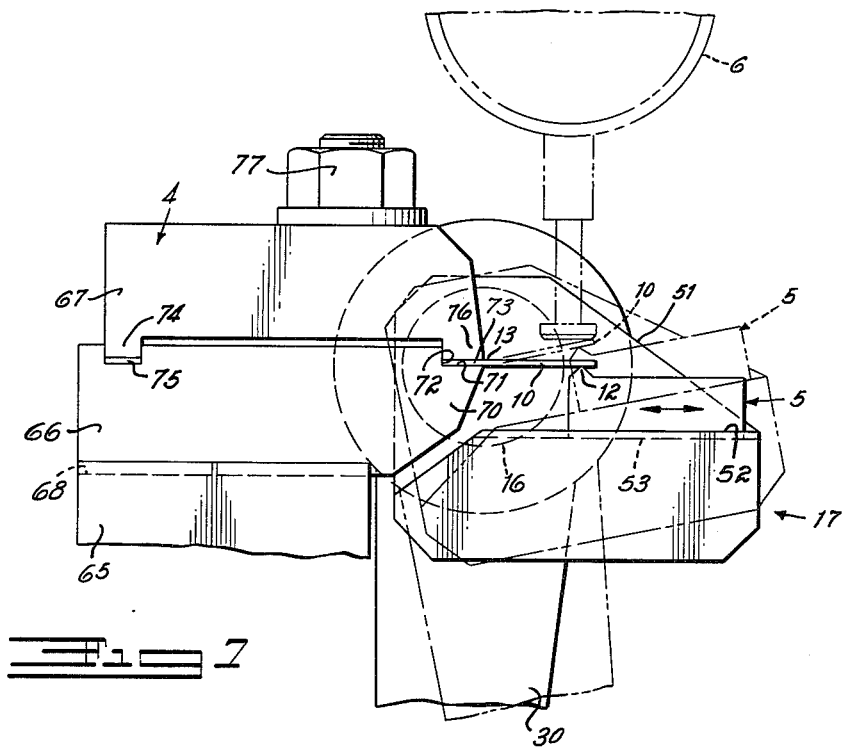
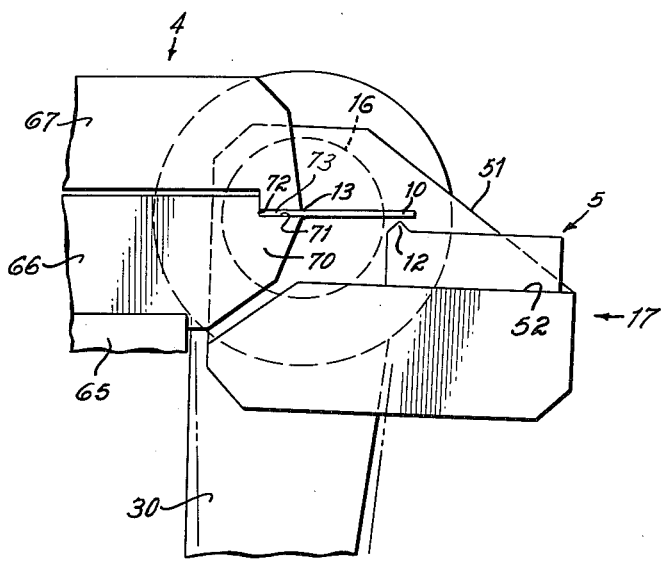

United States Patent Office 3,218,848
Patented Nov. 23, 1965

3,218,848
SIPE BEND TESTING MACHINE
John G. Wahlgren, Cuyahoga Falls, Ohio, assignor to American Brake Shoe Company, New York, N.Y., a corporation of Delaware
Filed Oct. 30, 1962, Ser. No. 234,142
9 Claims. (Cl. 73—100)

This invention relates to material testing apparatus and more particularly to a machine for measuring various properties of metal such as its deflection under bending stresses, resistance of fatigue, and the like, so that the metal may be evaluated for use in constructing sipes.

By way of introduction, it should be pointed out that a sipe is a shaped metal member which is mounted in a tire mold to form a narrow slit in the tread of a tire. Generally several hundred sipes are mounted in the inner surface of the tire mold and extend outwardly into the mold cavity. When a tire is formed within the mold the resulting grooves in the tire have the same cross sectional shape and size as the sipes which protrude from the mold.

One of the long standing problems in the tire molding industry has been to find an optimal material from which to manufacture the sipes. They are subjected to substantial bending stresses and deflections each time a tire is withdrawn from the mold and as a consequence, the sipes have a tendency to break. Of course, any tire produced within a mold which has a broken sipe mounted therein or any tire in which the sipe breaks off as it is removed from the tire mold is a defective tire.

Sipe breakage is expensive not only because of the defective tires produced but also because the replacement of sipes is a very exacting operation which often requires that the molds be removed from production for several days and shipped to a separate plant especially equipped to machine out broken sipes and insert new ones.

It has been an objective of this invention to produce a sipe metal testing machine capable of subjecting pieces of metal to accurately determined bending loads of the type to which a sipe is subjected in use. The present testing machine is further adapted to precisely repeat any desired loading so that a section of sipe material can be subjected to thousands of repetitive loads each identical with the other. Thus the effect of fatigue due to continued use can be evaluated with great accuracy.

More specifically, it has been an object of this invention to provide a testing machine in which a metal piece is mounted similar to the manner in which a sipe is mounted in a mold and is subjected to bending loads of a selected magnitude. The machines further include means for releasing and reapplying the load to repetitively stress the material.

Yet another object of this invention has been to provide apparatus by means of which a load may be applied to a sheet material at a point at a selected radius from the point of deflection or bending of the material, the point of application of the load remaining constant throughout the bending arc. To this end, in one preferred embodiment the material to be tested is clamped at a point located on the axis of rotation about which a bending force applying member in the form of a transverse knife edge is pivoted so that consequently the force applying knife edge does not slide relative to the material as the material is caused to deflect or bend. One advantage of this type of testing arrangement is that the deflection of the material may be very accurately measured as the material bends about a fixed point. In addition, when the load is repetitively applied in this manner the bending stresses are always very accurately applied to the same portions of the testing material.

Still another objective of this invention has been to provide apparatus by means of which a very accurate and precise load or force may be repetitively applied to a material without any variation of the load during each stress cycle. Apparatus having this characteristic results in a very accurate measurement of fatigue characteristics or "set" of the material under repeated bending or flexure.

Still another objective of this invention has been to provide testing apparatus for automatically and repetitively applying a bending force to a test specimen in which the bending load is applied to the specimen by a static weight mounted on a movable moment arm. In the preferred embodiment, the bending load is actually applied by the movable knife edge engaging the test specimen with a force determined by the weight and length of the moment arm. A motor driven mechanism returns the knife edge to a position in which the force is repetitively applied to the specimen but the recycling mechanism has no effect upon the knife edge or the bending force applied to the specimen during that portion of the cycle when the load actually is being applied to the specimen. With this type of repetitive force applying structure, the motor and automatic recycling apparatus exerts no bending stress upon the specimen so that friction between the recycling apparatus, motor, power fluctuations etc. do not introduce an unknown variable into the test apparatus.

Another object of the invention has been to provide a relatively inexpensive and uncomplicated test apparatus for accurately evaluating the performance characteristics of a material to be used in the production of sipes.

These and other objects and advantages will be more readily apparent from the following description of one embodiment of the invention, and the novel features will be particularly pointed out hereinafter in connection with the appended claims.

In the drawings:

FIGURE 1 is a top plan view of the testing apparatus of this invention,

FIGURE 2 is a front elevational view taken along the line 2—2 of FIGURE 1,

FIGURE 3 is a cross sectional view taken along the line 3—3 of FIGURE 1 in which the position of the torque arm during the clamping of the test sample is shown in dotted lines, FIGURE 4 is a cross sectional view taken along the line 4—4 of FIGURE 1, FIGURE 5 is a cross sectional view taken along the line 5—5 of FIGURE 1 showing the indicating arm in the raised position, FIGURE 6 is a cross sectional view taken along line 6—6 of FIGURE 3, FIGURE 7 is a schematic view of the clamp and force applying member illustrating the maximum deflection position of the test material in dotted lines, FIGURE 8 is a schematic view of the clamp and force applying member showing the force applying member in the position in which it is held while the test material is being clamped.

Referring particularly to FIGURES 1, 2 and 5, it will be seen that the testing machine of this invention comprises an electric drive motor 1, a gear reduction unit 2, a lost motion crank arm 3, a stationary clamp 4, an oscillating force applying member 5, and a deflection measuring device 6. These components are so interconnected as to repeatedly and very accurately apply and measure the results of a bending load on a test specimen 10. This stress is applied to the test specimen 10 by the force applying member 5 which has a knife edge 12 engageable with the specimen. As seen in FIGURES 5 and 7 movement of the knife edge 12 in the counterclockwise direction from the position illustrated in FIGURE 5 to that shown in phantom in FIGURE 7 causes the specimen 10 to flex or bend about a point 13 which is located on the line of intersection of the clamp 4, and the unsupported end of the test specimen 10. This point of flexure 13 or of maximum bending stress is coincident with the axis of rotation of the knife edge 12 so that the knife edge 12 remains at a fixed distance from the point of flexure 13 at all times. With this orientation of the knife edge 12 relative to the workpiece clamp 4 and the point of flexure, there is never any slippage between the knife edge and the test specimen as the knife edge 12 or force applying member 5 is oscillated to cause flexing of the test specimen. Thus the same bending stresses are repetitively applied throughout the test to the specimen and the maximum stress is always applied to a fixed and stationary point in the specimen.

Force upon the knife edge 12 in the counterclockwise or force applying direction is very accurately imparted to the member 5 by a torque arm 15 rigidly connected to torque shaft 16 upon which the force applying member 5 is mounted. Movement of the knife edge 12 in the clockwise direction from the position shown in FIGURE 5 to that shown in phantom in FIGURE 7 is derived from clockwise rotation of shaft 16. Torque is applied to the shaft 16 in the clockwise direction by the motor 1 acting through the gear reduction unit 2 and the lost motion crank arm 3. Thus the torque arm 15 is effective to accurately apply the load or bending stress to the specimen 10 while the motor and crank arm serve to remove the load from the test specimen and reposition the knife edge 12 in a position in which the force may be again applied. In this manner and as a result of the repetitive application of controlled bending stresses to the test specimen, the fatigue characteristics of the test material may be accurately determined.

The motor 1 is mounted upon a base 20. It drives a V-belt 21 which in turn drives the input shaft 22 of gear reduction unit 2. The output shaft 23 of the gear reduction unit is rigidly connected to an eccentric arm 24 within which is journalled a drive shaft 25. Drive shaft 25 extends forwardly from the eccentric arm 24 and has journalled on the forwardmost end, the lost motion crank arm 3. A ball bearing race 26 is mounted between the shaft 25 and crank arm 3 so as to limit or minimize friction between these two elements.

The crank arm 3 is drivingly connected to the torque shaft 16 through a drive arm 30 and lost motion connection 31 (FIGURES 3 and 6). As a result of this lost motion interconnection between the drive arm 30 and crank arm 3, all of the bending force applied to the torque shaft 16 is derived from the torque arm 15. Consequently, the bending force may be accurately imparted to the specimen 10 and in addition may be readily adjustable. If the bending forces were applied through the crank arm 3 as opposed to the torque arm 15 or a combination of the two, it would be extremely difficult if not impossible to alter or change these forces with any appreciable degree of accuracy.

The drive arm 30 is nonrotatably keyed to the torque shaft 16 by means of a drive key 32. An L-shaped bracket 33 is connected to the lower end of the drive arm 30 by means of a plurality of bolts 34 so that a recess 35 is formed between the bracket 33 and the drive arm 30. Within this recess 35 a pivoted block 36 is mounted upon trunnions 37 journalled in the drive arm 30 and the bracket 33. The crank arm 3 is slidingly mounted within an aperture 38 which extends generally horizontally through the pivoted block 36.

The free end of the crank arm 3 has threads 40 formed thereon. A knurled knob 41 threaded onto the threads 40 serves to hold a spring 42 in compression between the pivoted block 36 and one side 43 of the knurled knob 41. With this lost motion connection between the crank rod 3 and the drive arm 30, movement of the crank arm 3 toward the right, as viewed in FIGURE 3, imparts no movement to the drive arm 30 since the shaft is free to slide through the aperture 38 in the pivoted block 36. However, upon movement of the crank arm 3 to the left, the pressure of the spring 42 acting upon the block 36 forces the drive arm 30 in a counterclockwise direction from the position shown in solid lines in FIGURE 7 to that shown in phantom in this figure. Therefore the effect of the crank arm 3 is to move the drive arm 30 in the clockwise direction as shown in FIGURE 3 during one portion of its stroke and to release the drive arm for free counterclockwise movement during the other portion or half of its cycle or stroke.

With reference to FIGURE 1, it will be seen that the drive arm 30 is connected to one end of the torque shaft 16 and that the torque arm 15 is connected to the opposite end of the shaft 16. Between these ends, the torque shaft 16 is supported within a pair of journal blocks 45, 46. The journal blocks 45, 46 are bolted to a stationary supporting platform 47 which is welded to the base 20.

Located between the journal blocks 45, 46 is a platform section 17 of the torque shaft 16 upon which the force applying member 5 is mounted. In the preferred embodiment, this section 17 consists of a generally U-shaped portion of the torque shaft although it may be a separate element welded or otherwise connected to the shaft 16. Spacer sleeves 44 are located between the journal blocks 45, 46 and the platform section 17 of the torque shaft to prevent axial movement of the torque shaft within the journal blocks. The platform section 17 of the torque shaft 16 forms a recess 52 in the shaft between the lateral side wall portions 50, 51. The bottom surface of recess 52 serves as a flat seat for the force applying member 5. A groove 53 formed in the bottom of the recess 52 receives a tongue or keyway 54 depending from the bottom of the force applying member 5.

In order to securely hold the force applying member 5 in an adjusted position on the platform section 17 of the torque shaft 16, a hold down bolt 56 extends through an elongated aperture 57 in the member 5 and is threaded into a threaded recess 58 in the platform section 17. The elongated aperture 57 is provided with a recessed shoulder 61 in its upper surface against which the head of the bolt 56 abuts when it is threaded into the platform 17. As shown in FIGURE 1, indicia 62 are provided along one side of the platform section 17 so that the distance between the axis of rotation of the platform section 17 and the knife edge 12 may be easily determined.

Referring to FIGURE 5, it will be seen that the bottom of the recess 52 tapers downwardly away from the bottom surface of the recess in the area adjacent the clamp 4 so as to provide a clearance space for the clamp 4. The clamp 4 consists of a stationary supporting block 65, an intermediate member 66 and a clamping top member 67. The bottom member is welded or otherwise secured to the platform 47. Extending along the top surface of the bottom member 65 is a groove 68 within which is received the intermediate member 66 which is bolted to the bottom member 65 so as to make one integral structure of the bottom member 65 and intermediate member 66. An end or nose section 70 of the intermediate member 66 extends into the recess 52 formed in the platform section 17 of the torque shaft 16. This end or nose section 70 is recessed at its forwardmost end so as to provide an upper surface 71 upon which the bottom surface of the test specimen 10 is received and a rear surface 72 against which the edge of the test specimen abuts. The recess 73 in the nose section thus provides a seat for a test specimen which accurately and positively locates each test specimen in an identical position in the clamp.

The top or clamp member 67 is equipped with a rib 74 extending downwardly from its bottom surface and received within a groove 75 formed in the top surface of the intermediate member 66. At its forwardmost end, the top member 67 is equipped with a nose section 76 which also extends into the recess 52 in the platform section 17. The bottom of the nose section 76 has a depending lip of the same width as the recess 73 and adapted to be received within the recess 73. The rib extending downwardly from the nose section 76 of the top member thus cooperates with the recess 73 in the intermediate member to accurately position and securely hold the test specimen 10. The top or clamping member 67 is releasably secured to the intermediate member 66 by a bolt 77 which extends through the clamping member 67 into a threaded aperture in the intermediate member. Since sipes are conventionally mounted in tire molds by means of a press fit within the mold, the gripping action of the clamp 4 is similar to the gripping action of the mold in that both utilize frictional engagement between the sides of the sipe and the recess within which it is mounted to securely hold the sipe in a fixed position.

During that portion of the oscillatory cycle when the bending force is being applied to the test specimen or, otherwise expressed, when the knife edge is being rotated in the counterclockwise direction from the position shown in FIGURE 5 to that shown in phantom in FIGURE 7 force is accurately applied to the torque shaft 16 by means of the torque arm 15. The torque arm 15 consists of a torque transmitting plate 80 non-rotatably keyed to the torque shaft 16 by a key 81 (FIGURE 2). The torque arm is adjustably attached to the torque transfer plate 80 by means of bolts 82 which pass through arcuate slots 83 in the torque arm 15 and are threadedly received in threaded apertures in the torque transfer plate 80.

The upper edge of the torque arm 15 has a plurality of serrations 83A therealong so as to provide recesses within which a weight carrier arm 84 may be located. As shown in FIGURE 2, the torque arm has indicia located along the serrations to indicate the moment arm or the distance the weight is located from the point of flexure 13 and axis of rotation of the torque shaft.

The weight carrier arm which depends or hangs from the torque arm 15 consists of a shaft 85 extending downwardly from a bifurcated plate 86. At the top slot forming the bifurcation in the plate 86 is a cross piece 87 having a pointer 88 extending downwardly and located in one of the serrations 83A in the top surface of the torque arm 15. The lower end of the carrier arm shaft 85 has a flat weight supporting plate 89 suspended thereon and held on the shaft by means of a nut 90 threaded onto the lower end of the shaft 85.

Assuming that it is desired to measure the deflection of a test specimen 10 with one foot pound of force applied thereto, it is only necessary to place a one pound weight upon the support plate 89 and locate the pointer 88 in the serration 83A adjacent the twelve inch indicia. In a similar manner, bending forces of other magnitudes may be accurately applied to the test specimen by altering the length of the moment arm or the weight upon the carrier plate 89.

To counterbalance the dead weight of the torque arm 15, weight carrier arm 84, knife edge supporting platform 17, etc., a horizontally extending counterbalance supporting shaft is attached to the drive arm 30. A counterweight 96 is slidably mounted along the shaft 95 and has a set screw 97 engaged with the shaft so as to securely hold the weight in an adjusted position.

Before a bending test is started, the weight 96 is located along the shaft 95 in a position in which the weight 96 exactly counterbalances the dead weight of the torque arm 15, weight carrier arm 84, etc. When these weights exactly counterbalance each other, a weight may be selected and placed upon the weight supporting platform 89 with certainty that the force applied to the test specimen will be exactly equal to that indicated by the torque arm 15 and weight.

To facilitate ease of removal and insertion of the test specimen into the test apparatus, latching mechanism 100 (FIGURE 3) is provided to move the supporting platform 17 and thus the knife edge 12 into a position out of engagement with the bottom of the test specimen 10 (FIGURE 8). The latching mechanism consists of a flat plate 101 which has a vertically extending slot therein. Mounted within the slot upon a pivot shaft 102 is a latching member 103 which is adapted in its raised position to be received within a slot 104 in the bottom of the drive arm shaft 30 and in the lower position to rest upon the top surface of the base plate 20. In the lower or unlatched position, the latch member 103 does not interfere with the oscillatory movement of the drive arm 30.

The measuring device is mounted upon a pivot arm which permits it to be moved into and out of a position of engagement with the test specimen. With the gauge 6 in the raised position as shown in FIGURE 5, the test specimen may be easily inserted into and removed from the clamp 4. The gauge supporting bracket 107 is adjustably bolted to the base 20 by a plurality of bolts 108 which extend through slotted apertures 109 in the base of the bracket 107. Near its upper end, the bracket 107 has an overhanging arm 110 extending toward the test specimen. At the outer end of this overhanging arm 110 is a rest pad 111 upon which the feeler gauge supporting arm 112 seats when in its lower or test specimen engaging position. The arm 112 is mounted upon a pivot shaft 113 journalled in two support plates 114 which extend upwardly from the mounting bracket 107. The feeler gauge 6 is attached to the outer end of the gauge supporting arm 112 by a wing bolt 115 (FIGURE 1) threaded onto a stem (not shown) which passes through an aperture in the feeler gauge supporting arm.

The operation of the sipe testing apparatus is as follows:

With the feeler gauge in the raised position as shown in FIGURE 5 and the latch 100 in engagement with the drive arm 30 the material to be tested is placed in the clamp 4. The latching member 100 is then disengaged from the drive arm 30 so as to move the knife edge 12 into a position of engagement with the bottom of the test specimen as shown in FIGURE 7 and the feeler gauge is placed in engagement with the top of the specimen. The weight carrier arm is then placed at a location on the torque arm 15 which corresponds to the desired moment arm and the proper amount of weight is placed upon the plate 89. The electric motor 1 then drives the gear reduction unit 2 so as to cause rotation of the crank arm 3 and oscillation of the drive arm 30 and torque shaft 16. As the crank arm 3 moves to the right as viewed in FIGURE 3, the crank arm 3 exerts no force upon the drive arm 30 but merely frees it for movement in the counterclockwise direction under the force applied by the torque arm 15. The test specimen 10 deflects to the extent determined by the strength of the specimen material 10 after which the crank arm 3 continues to move to the right with no corresponding movement of the drive arm 30 since the torque shaft 16 is restrained against movement by engagement of the knife edge 12 with the deflected test specimen. As the crank arm 3 moves to the left as viewed in FIGURE 3, the spring 42 engages the pivot block 36 and forces the drive arm 30 to the left when the force of the spring 42 acting against the pivot block 36 overcomes the force applied in the opposite direction by the torque arm 15. This cycle is repeated automatically for the desired number of applications of the bending stress to the specimen. Since the cycle is automatic and repeated at a rate determined by the speed of the motor 1 and the gear ratio within the gear reduction unit 2, the specimen may be left within the testing machine for any desired length of time to determine the fatigue characteristics of the material. As an example, if the machine is operating at 30 cycles per minute, the specimen may be left in the machine for 100 hours to determine the effect of a given force applied at a selected distance from the point of flexure after 18,000 applications of the force.

By using this test apparatus to determine the fatigue characteristics and "set" of a test material after numerous deflections, the optimal material from which to make the sipes for tire molds may be determined. Since the sipes deflect every time a tire is removed from a tire mold and must always return to their identical original position in order that each tread of the tire is always properly oriented with respect to other treads and properly located within the tire, it is important that the sipes be capable of deflection but that they not accept a "set" and that they do not become work hardened and subject to breakage after having had bending stresses applied thereto a small number of times. With this test apparatus, the comparative results of different alloy and heat treated materials may be determined so as to enable the optimal material to be utilized in the manufacture of tire molding sipes.

From the foregoing disclosure of the general principles of the present invention and the above detailed description of a preferred embodiment, those skilled in the art will readily comprehend various modifications to which the invention is susceptible. Thus, for example, while the apparatus will normally be used to test planar strips of material, it is also contemplated that the apparatus can be used to test strips of material of actual sipe configurations. Therefore, I desire to be limited only by the scope of the following claims.

I claim:

1. Bend testing apparatus for measuring deflection of a test specimen comprising
   means for rigidly supporting a first end of said specimen with the opposite end of said specimen extending outwardly from said support means,
   a pressure means for applying a presettable and predetermined bending force to said specimen at a point spaced from said first end of said specimen,
   one of said means being rotatable relative to the other of said means,
   means for moving said rotatable means through a fixed radius arcuate path about an axis extending approximately through the point of flexure of said specimen, and
   means for measuring the deflection of said specimen upon application of said force to said specimen.

2. Bend testing apparatus for measuring deflection of a test specimen under repetitive bending conditions comprising
   means for rigidly supporting a first end of said specimen with the opposite end of said specimen extending outwardly from said support means,
   a pressure means for applying a presettable and predetermined bending force to said specimen at a point spaced from said first end of said specimen,
   one of said means being movable through an arcuate path relative to the other of said means,
   means for repeatedly oscillating said movable means through a fixed radius arcuate path about an axis extending generally through the point of flexure of said specimen, and
   means for measuring the deflection of said specimen upon application of said force to said specimen.

3. Sipe testing apparatus for measuring deflection of a test specimen under repetitive bending conditions comprising
   means for rigidly supporting a first end of said specimen with the opposite end of said specimen extending outwardly from said support means,
   a pressure means for applying a predetermined bending force to said specimen at a point spaced from said first end of said specimen,
   one of said means being movable relative to the other of said means,
   static weight means mounted upon a movable arm for moving said movably mounted means in a first direction to apply a bending force to said specimen independently of any other source of bending force,
   motor means for moving said movably mounted means in a second direction opposite said first direction to remove the bending force from said specimen, and
   means for measuring the deflection of said specimen upon application of said predetermined force to said specimen.

4. Sipe testing apparatus for measuring deflection of a test specimen under repetitive bending conditions comprising
   means for rigidly supporting a first end of said specimen with the opposite end of said specimen extending outwardly from said support means,
   a pressure means for applying a bending force to said specimen at a point spaced from said first end of said specimen,
   one of said means being movable relative to the other of said means,
   static weight means mounted upon a movable arm for moving said movably mounted meaens in a first direction to apply a bending force to said specimen independently of any other source of bending force,
   motor means interconnected to said movably mounted means through a lost motion connection for moving said movably mounted means in a second direction to remove the bending force from said specimen, and
   means for measuring the deflection of said specimen upon application of said force to said specimen.

5. Sipe testing apparatus for measuring deflection of a test specimen under repetitive bending conditions comprising
   clamping means for rigidly supporting a first end of said specimen with the opposite end of said specimen extending outwardly from said support means,
   a force applying member for repetitively applying a bending force to said specimen at a point spaced from said first end of said specimen,
   said force applying member being movable relative to the clamping means,
   static weight means mounted upon a movable arm for moving said force applying member in a first direction to apply a bending force to said specimen independently of any other source of bending force,
   motor means interconnected to said movably mounted means through a lost motion connection for moving said force applying member in an opposite direction to remove the bending force from said specimen, and
   means for measuring the deflection of said specimen upon repetitive application of said force to said specimen.

6. Sipe testing apparatus for measuring deflection of a test specimen under repetitive bending conditions comprising
   clamping means for rigidly supporting a first end of said specimen with the opposite end of said specimen extending outwardly from said support means,
   a knife edge member for applying a bending force to said specimen at a point spaced from said first end of said specimen,
   said knife edge member being oscillatable relative to said clamping means,
   static weight means mounted upon a movable arm for rotating said knife edge member in a first direction to apply a bending force to said specimen independently of any other source of bending force,
   motor means interconnected to said movably mounted means through a lost motion connection for rotating said movably mounted means in an opposite direction to remove the bending force from said specimen, and
   means for measuring the deflection of said specimen upon application of repetitive bending forces to said specimen.

7. Sipe testing apparatus for measuring deflection of a test specimen under repetitive bending conditions comprising clamping means for rigidly supporting a first end of said specimen with the opposite end of said specimen extending outwardly from said support means, an adjustably mounted knife edge member for applying a bending force to said specimen at a point spaced from said first end of said specimen, said knife edge member being oscillatable relative to said clamping means, static weight means movably mounted along a torque arm for rotating said knife edge member in a first direction to apply a bending force to said specimen independently of any other source of bending force, motor means interconnected to said movably mounted means through a lost motion connection for rotating said movably mounted means in an opposite direction to remove the bending force from said specimen, and means for measuring the deflection of said specimen upon application of repetitive bending forces to said specimen.

8. Sipe testing apparatus for measuring deflection of a test specimen under repetitive bending conditions comprising clamping means for rigidly supporting a first end of said specimen with the opposite end of said specimen extending outwardly from said support means, an oscillatable torque shaft, a force applying member mounted upon said shaft for applying a bending force to said specimen at a point spaced from said first end of said specimen, static weight means mounted upon a torque arm for rotating said torque shaft in a first direction to apply a bending force to said specimen independently of any other source of bending force, motor means interconnected to said torque shaft through a lost motion connection for rotating said movably mounted means in an opposite direction to remove the bending force from said specimen, and means for measuring the deflection of said specimen upon application of repetitive bending forces to said specimen.

9. Sipe testing apparatus for measuring deflection of a test specimen under repetitive bending conditions comprising clamping means for rigidly supporting a first end of said specimen with the opposite end of said specimen extending outwardly from said support means, an oscillatable torque shaft, a force applying member mounted upon said shaft for applying a bending force to said specimen at a point spaced from said first end of said specimen, static weight means adjustably movable along a torque arm for rotating said torque shaft in a first direction to apply a bending force to said specimen independently of any other source of bending force, motor means interconnected to said torque shaft through a lost motion connection for rotating said movably mounted means in an opposite direction to remove the bending force from said specimen, and means for measuring the deflection of said specimen upon application of repetitive bending forces to said specimen.

References Cited by the Examiner

UNITED STATES PATENTS

| | | | |
|---|---|---|---|
| 2,007,286 | 7/1935 | Schopper | 73—91 |
| 2,243,413 | 5/1941 | Buckingham | 73—100 |
| 2,386,472 | 10/1945 | Kaemmerling | 73—100 |
| 2,453,023 | 11/1948 | L'Hermite | 73—100 |
| 2,591,444 | 4/1952 | Lazan | 73—100 X |
| 3,008,328 | 11/1961 | Cope et al. | 73—100 |

FOREIGN PATENTS 833,510    4/1960    Great Britain.

RICHARD C. QUEISSER, *Primary Examiner.*

DAVID SCHONBERG, *Examiner.*